(12) United States Patent
Lee

(10) Patent No.: US 8,265,705 B2
(45) Date of Patent: Sep. 11, 2012

(54) MOBILE TERMINAL AND METHOD OF EXECUTING CALL FUNCTION USING THE SAME

(75) Inventor: Khwanhee Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 293 days.

(21) Appl. No.: 12/603,626

(22) Filed: Oct. 22, 2009

(65) Prior Publication Data

US 2010/0298033 A1    Nov. 25, 2010

(30) Foreign Application Priority Data

May 22, 2009  (KR) .................. 10-2009-0044912

(51) Int. Cl.
*H04B 1/38* (2006.01)
(52) U.S. Cl. .............. 455/566; 379/433.04; 345/169; 345/173
(58) Field of Classification Search ............ 455/566, 455/569.1, 575.1, 575.3, 550.1; 379/433.04, 379/433.01; 345/169, 173, 156, 1.1–1.3
See application file for complete search history.

(56) References Cited

U.S. PATENT DOCUMENTS 7,069,056 B2 * 6/2006 Iwata et al. .............. 455/566
7,239,900 B2 * 7/2007 Choi et al. ............... 455/575.3

FOREIGN PATENT DOCUMENTS

| EP | 1 076 442 A2 | 2/2001 |
| EP | 1076442 A2 * | 2/2001 |
| EP | 1 775 925 A2 | 4/2007 |
| EP | 1 826 989 A1 | 8/2007 |
| WO | WO 2006/123211 A2 * | 11/2006 |
| WO | WO 2008/146747 A1 | 12/2008 |

OTHER PUBLICATIONS

European Search Report dated Oct. 6, 2010 issued in Application No. 09 01 3758.

* cited by examiner

*Primary Examiner* — Nay A Maung
*Assistant Examiner* — Angelica Perez
(74) *Attorney, Agent, or Firm* — KED & Associates, LLP

(57) ABSTRACT

A mobile terminal and a method of executing a call function using the mobile terminal are provided such that the call function is executed in the mobile terminal including a plurality of touch screens, and various graphic user interfaces with respect to the call function are displayed to a user such that the user can conveniently use the call function.

16 Claims, 16 Drawing Sheets

FIG. 2
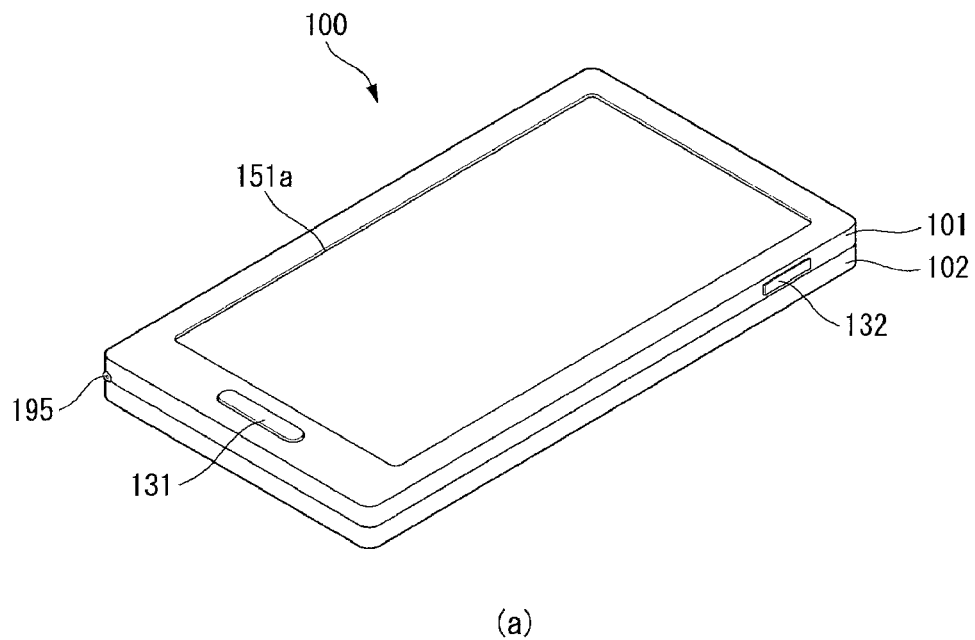
(a)
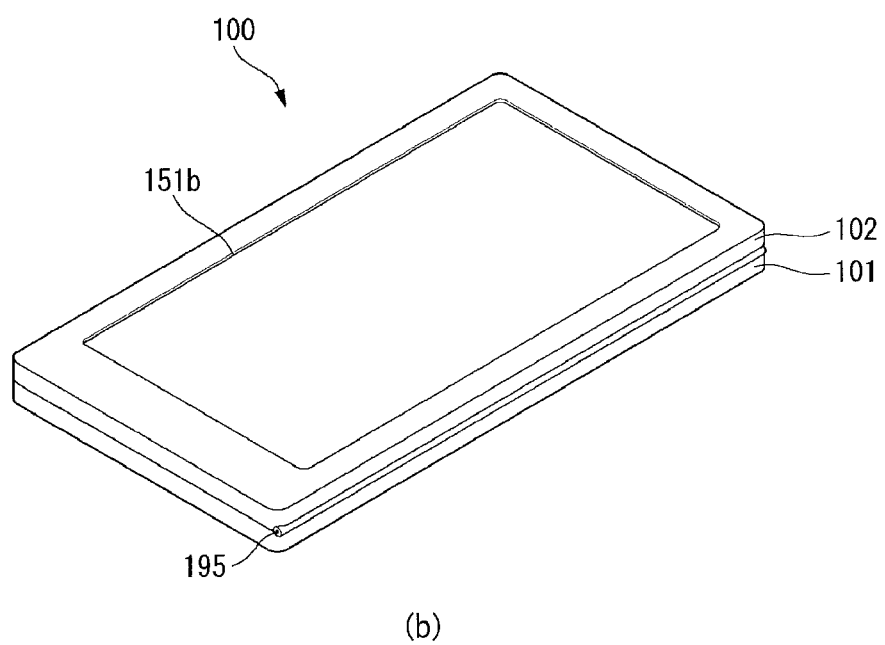
(b)

FIG. 3
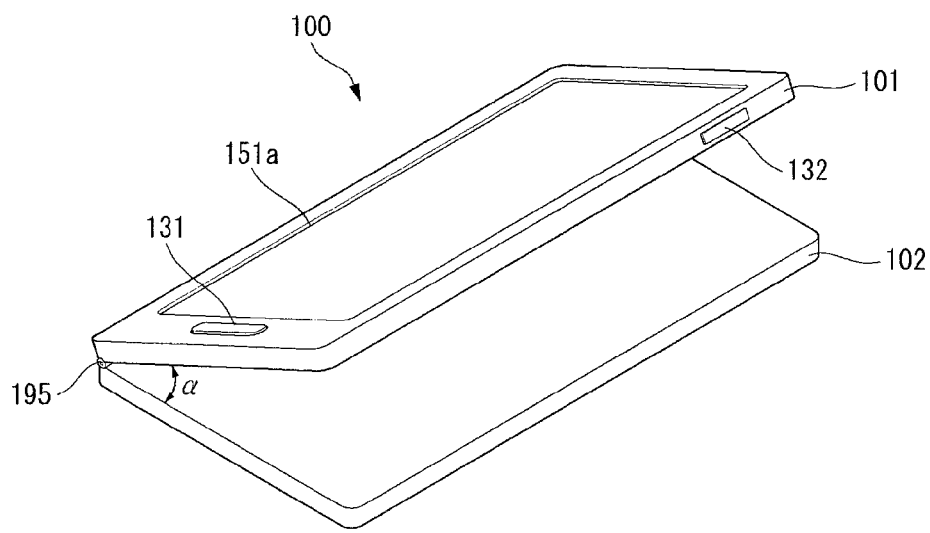
(a)
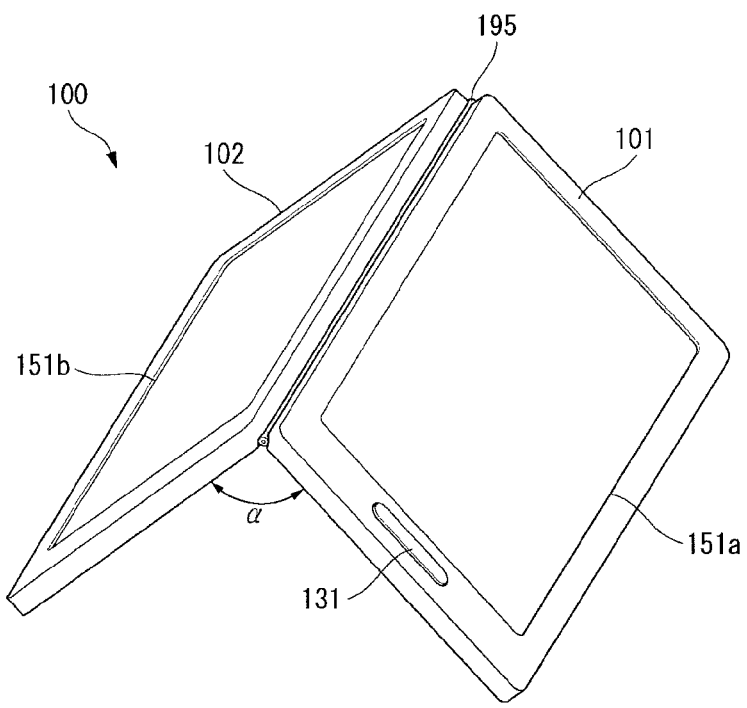
(b)

FIG. 6
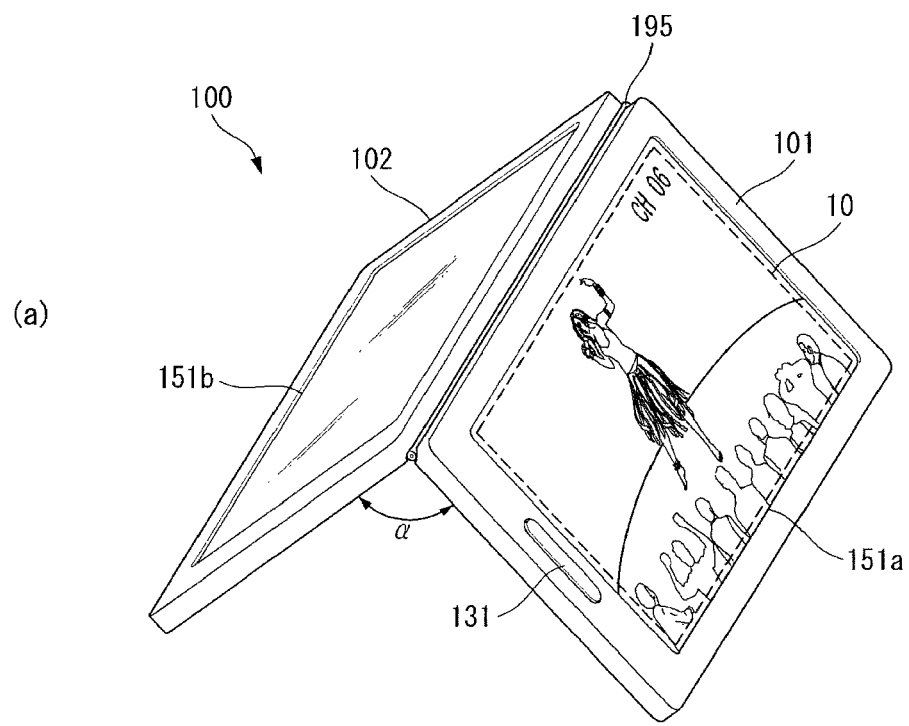
(a)
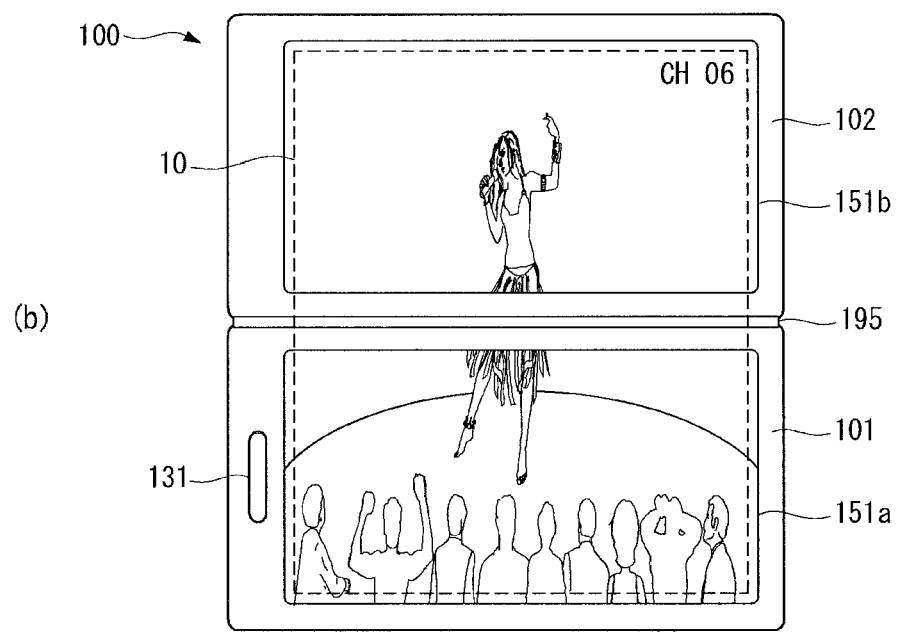
(b)

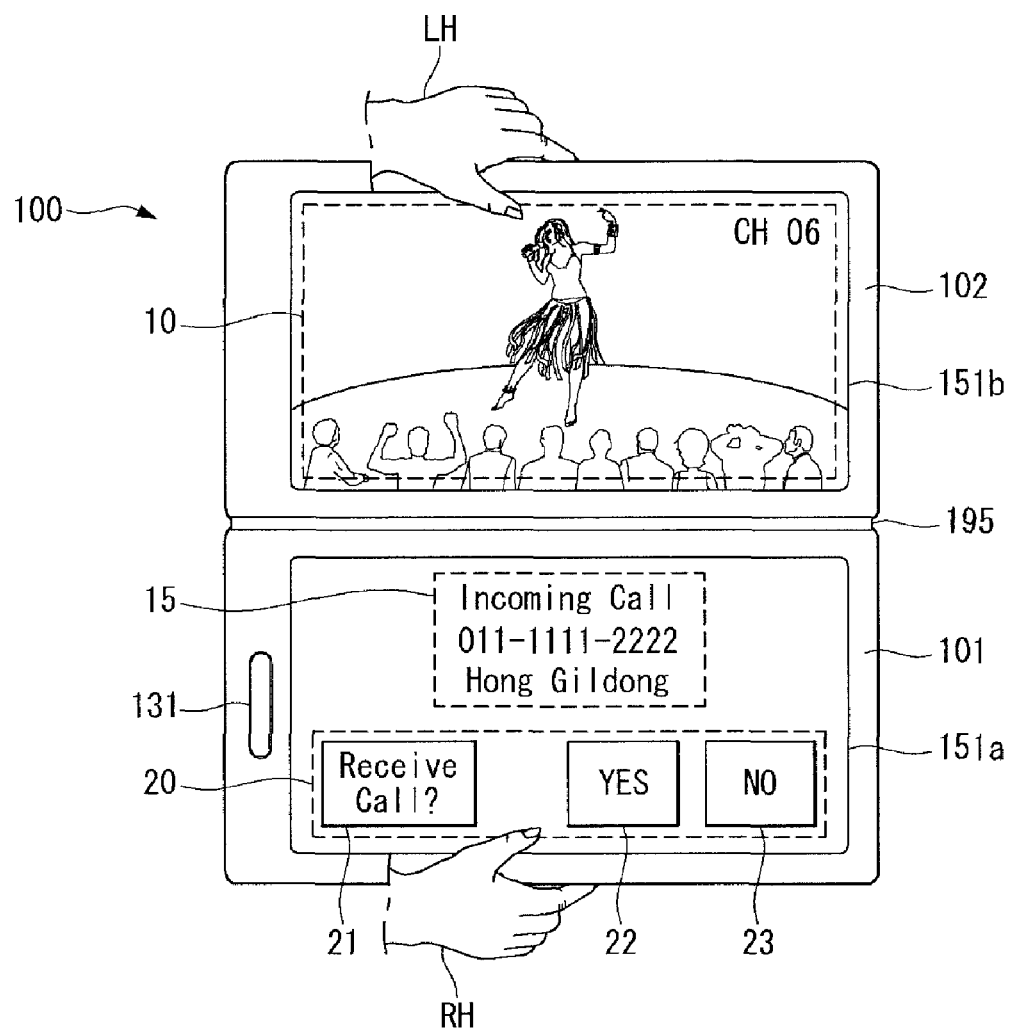

MOBILE TERMINAL AND METHOD OF EXECUTING CALL FUNCTION USING THE SAME

The present application claims priority from Korean Application No. 10-2009-0044912, filed May 22, 2009, the subject matter of which is hereby incorporated by reference.

BACKGROUND

1. Field

Embodiments of the present disclosure may relate to a mobile terminal having a plurality of touch screens that provide various graphic user interfaces with respect to a call function when executing the call function.

2. Background

Mobile terminals may have various functions and shapes. However, it is inconvenient for a user to operate the mobile terminal due to a restriction on size of the display of the mobile terminal.

BRIEF DESCRIPTION OF THE DRAWINGS

Arrangements and embodiments may be described in detail with reference to the following drawings in which like reference numerals refer to like elements and wherein:

FIGS. 2, 3, 4A and 4B illustrate an external appearance of the mobile terminal;

FIGS. 6(a) and 6(b) illustrates exemplary images displayed on the mobile terminal when operation S100 (in FIG. 5) is performed;

FIG. 7B illustrates an example of step S103B (in FIG. 5);

DETAILED DESCRIPTION

In the following description, suffixes "module" and "unit" are given to components of the mobile terminal for ease of description. The mobile terminal may include a cellular phone, a smart phone, a laptop computer, a digital broadcasting terminal, personal digital assistants (PDA), a portable multimedia player (PMP), a navigation system and so on.

Figure 1:
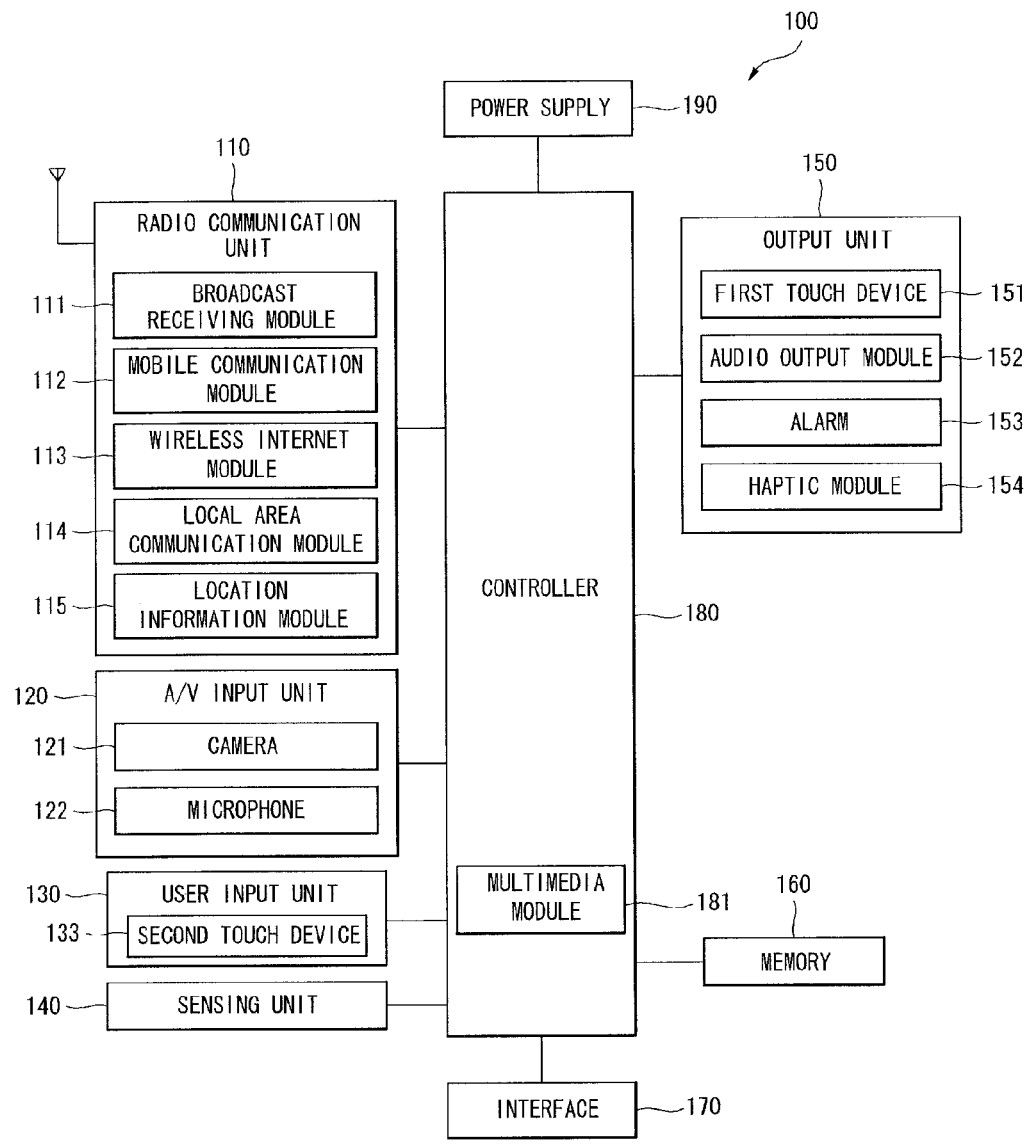
FIG. 1 is a block diagram of a mobile terminal according to an example embodiment.

FIG. 1 is a block diagram of a mobile terminal according to an example embodiment. As shown in FIG. 1, a mobile terminal 100 may include a radio communication unit 110, an audio/video (A/V) input unit 120, a user input unit 130, a sensing unit 140, an output unit 150, a memory 160, an interface 170, a controller 180 and a power supply 190.

The radio communication unit 110 may include at least one module that enables radio communication between the mobile terminal 100 and a radio communication system or between the mobile terminal 100 and a network in which the mobile terminal 100 is located. For example, the radio communication unit 110 may include a broadcasting receiving module 111, a mobile communication module 112, a wireless Internet module 113, a local area communication module 114 and a position information module 115 (or a location information module).

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals and data broadcasting signals, but also signals in a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of the digital multimedia broadcasting (DMB) system or in the form of an electronic service guide (ESG) of the digital video broadcast-handheld (DVB-H) system.

The broadcasting receiving module 111 may receive broadcasting signals using various broadcasting systems. The broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems, etc. The broadcasting receiving module 111 may also be constructed to be suited to broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal and/or data in various forms according to transmission and reception of text/multimedia messages.

The wireless Internet module 113 may correspond to a module for wireless Internet access and may be included in the mobile terminal 100 or externally attached to the mobile terminal 100. A wireless LAN (WLAN) (Wi-Fi), wireless broadband (Wibro), world interoperability for microwave access (Wimax), high speed downlink packet access (HSDPA) and so on may be used as a wireless Internet technique.

The local area communication module 114 may correspond to a module for local area communication. Further, bluetooth, radio frequency identification (RFID), infrared data association (IrDA), ultra wideband (UWB) and ZigBee may be used as a local area communication technique.

The position information module 115 may confirm or obtain a position of the mobile terminal 100. The position information module 115 can obtain position information by using a global navigation satellite system (GNSS). The GNSS is a terminology describing radio navigation satellite systems that revolve round the earth and transmit reference signals to predetermined types of radio navigation receivers such that the radio navigation receivers may determine their positions on the earth's surface or near the earth's surface. The GNSS may include a global positioning system (GPS) of the United States, Galileo of Europe, global orbiting navigational satellite system (GLONASS) of Russia, COMPASS of China, quasi-zenith satellite system (QZSS) of Japan and so on.

A global positioning system (GPS) module is a representative example of the position information module 115. The GPS module 115 may calculate information on distances between one point or object and at least three satellites and information on a time when distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. The GPS module 115 may continuously calculate a current position in real time and calculate velocity information using the position information.

The A/V input unit 120 may input an audio signal or a video signal and include a camera 121 and a microphone 122. The camera 121 may process image frames of still images or moving images obtained by an image sensor in a video telephony mode or a photographing mode. The processed image frames may be displayed on a display 151.

The image frames processed by the camera 121 may be stored in the memory 160 or may be transmitted to an external device through the radio communication unit 110. The mobile terminal 100 may also include at least two cameras.

The microphone 122 may receive an external audio signal in a call mode, a recording mode or a speech recognition mode and process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithms) for removing or reducing noise generated when the external audio signal is received.

The user input unit 130 may receive input data for controlling operation of the terminal from a user. The user input unit 130 may include a keypad, a dome switch, a touch pad (constant voltage/capacitance), a jog wheel, a jog switch and so on.

The sensing unit 140 may sense the current state of the mobile terminal 100, such as an open/close state of the mobile terminal 100, a position of the mobile terminal 100, whether a user touches the mobile terminal 100, a direction of the mobile terminal 100 and an acceleration/deceleration of the mobile terminal 100, and generate a sensing signal for controlling the operation of the mobile terminal 100. For example, the sensing unit 140 may sense whether a slide phone is opened or closed when the mobile terminal 100 is the slide phone. The sensing unit 140 may sense whether the power supply 190 supplies power and whether the interface 170 is connected to an external device. The sensing unit 140 may also include a proximity sensor.

The output unit 150 may generate visual, auditory and/or tactile output and can include the display 151, an audio output module 152, an alarm 153 and a haptic module 154. The display 151 may display information processed by the mobile terminal 100. For example, the display 151 may display a user interface (UI) or a graphic user interface (GUI) related to a telephone call when the mobile terminal 100 is in the call mode. The display 151 may also display a captured and/or received image, a UI or a GUI when the mobile terminal 100 is in the video telephony mode or the photographing mode.

The display 151 may include at least one of a liquid crystal display, a thin film transistor liquid crystal display, an organic light-emitting diode display, a flexible display and a three-dimensional display. Some of these displays may be of a transparent type or a light transmission type. The display 151 may include a transparent display.

The transparent display may include a transparent liquid crystal display. A rear structure of the display 151 may also be of the light transmission type. Accordingly, a user may see an object located behind the body of the mobile terminal 100 through the transparent area of the body of the mobile terminal 100, which is occupied by the display 151.

The mobile terminal 100 may also include at least two display units 151. For example, the mobile terminal 100 can include a plurality of displays that are arranged on a single face at a predetermined distance or integrated displays. The plurality of displays may also be arranged on different sides.

When the display 151 and a sensor sensing touch (hereafter called a touch sensor) form a layered structure, which may hereafter be referred to as a touch screen, the display 151 may be used as an input device in addition to an output device. The touch sensor may be in the form of a touch film, a touch sheet and a touch pad, for example.

The touch sensor may convert a variation in pressure applied to a specific portion of the display 151 or a variation in capacitance generated at a specific portion of the display 151 into an electric input signal. The touch sensor may sense pressure of touch as well as a position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display 151.

The proximity sensor of the sensing unit 140 may be located in an internal region of the mobile terminal 100, surrounded by the touch screen, and/or near the touch screen. The proximity sensor may sense an object approaching a predetermined sensing face or an object located near the proximity sensor using an electromagnetic force or infrared rays without having mechanical contact. The proximity sensor may have a lifetime longer than a contact sensor and thus may have a wide application in the mobile terminal 100.

The proximity sensor may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc. A capacitive touch screen may be constructed such that proximity of a pointer may be detected through a variation in an electric field according to proximity of the pointer. In this instance, the touch screen (or touch sensor) may be classified as a proximity sensor.

For ease of explanation, an action of the pointer approaching the touch screen without actually touching the touch screen may be referred to as a proximity touch and an action of bringing the pointer into contact with the touch screen may be referred to as a contact touch. In addition, the proximity touch point of the pointer on the touch screen may correspond to a point of the touch screen to which the pointer touches the touch screen.

The proximity sensor may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the radio communication unit 110 or stored in the memory 160 in a call signal receiving mode, a telephone call mode or a recording mode, a speech recognition mode and a broadcasting receiving mode. The audio output module 152 may output audio signals related to functions (e.g., a call signal incoming tone, a message incoming tone, etc.) performed in the mobile terminal 100. The audio output module 152 may include a receiver, a speaker, a buzzer, etc. The audio output module 152 may output sounds through an earphone jack. The user may hear the sounds by connecting an earphone to the earphone jack.

The alarm 153 may output a signal indicating generation of an event of the mobile terminal 100. For example, alarms may be generated when receiving a call signal, receiving a message, inputting a key signal, inputting touch, etc. The alarm 153 may also output signals in forms different from video signals or audio signals, for example, a signal for indicating generation of an event through vibration. The video signals or the audio signals may also be output through the display 151 or the audio output module 152.

The haptic module 154 may generate various haptic effects that the user can feel. One representative example of the haptic effects is vibration. An intensity and pattern of vibration generated by the haptic module 154 may also be controlled. For example, different vibrations may be combined and output or can be sequentially output.

The haptic module 154 may generate a variety of haptic effects including an effect of stimulus according to arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operation of the controller 180 and may temporarily store input/output data (e.g., phone book, messages, still images, moving images, etc.). The memory 160 may also store data about vibrations and sounds in various patterns that are output from when a touch input is applied to the touch screen.

The memory 160 may include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 may also operate in relation to a web storage that performs a storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. The interface 170 may include a wired/wireless headset port, an external charger port, a wired/wireless data port, a memory card port, a port for connecting a device having a user identification module, an audio I/O port, a video I/O port, an earphone port, etc., for example.

The interface 170 may also interface with a user identification module that is a chip that stores information for authenticating an authority to use the mobile terminal 100. For example, the user identification module may be a user identify module (UIM), a subscriber identify module (SIM) and a universal subscriber identify module (USIM). An identification device including the user identification module may also be manufactured in the form of a smart card. The identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 also may include a multimedia module 181 for playing multimedia. The multimedia module 181 may be included in the controller 180 or may be separated from the controller 180.

The controller 180 may perform a pattern recognition process capable of recognizing handwriting input or picture-drawing input applied to the touch screen as characters or images. The power supply 190 may receive external power and internal power and provide power required for operations of the components of the mobile terminal 100 under the control of the controller 180.

According to hardware implementation, embodiments of the present disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for executing functions. Embodiments may be implemented by the controller 180.

According to software implementation, embodiments such as procedures or functions can be implemented with a separate software module executing at least one function or operation. Software codes can be implemented according to a software application written in an appropriate software language.

The software codes may be stored in the memory 160 and executed by the controller 180.

FIGS. 2, 3, 4A and 4B illustrates an external appearance of the mobile terminal 100 according to the embodiments of the present disclosure. The mobile terminal 100 may include a first body 101 and a second body 102 that are combined with each other through a combining part 195.

The first body 101 and the second body 102 may be combined with each other in various manners. For example, the combining part 195 may combine the first body 101 and the second body 102 with each other in such a manner that the mobile terminal 100 is folded into the first body 101 and the second body 102. The combining part 195 may combine the first body 101 and the second body 102 such that the first body 101 and the second body 102 can slide in opposite directions. While embodiments of the first body 101 and the second body 102 are combined by the combining part 195 in such a manner that the mobile terminal 100 is folded into the first body 101 and the second body 102, embodiments of the present disclosure are not limited thereto.

Figure 4A:
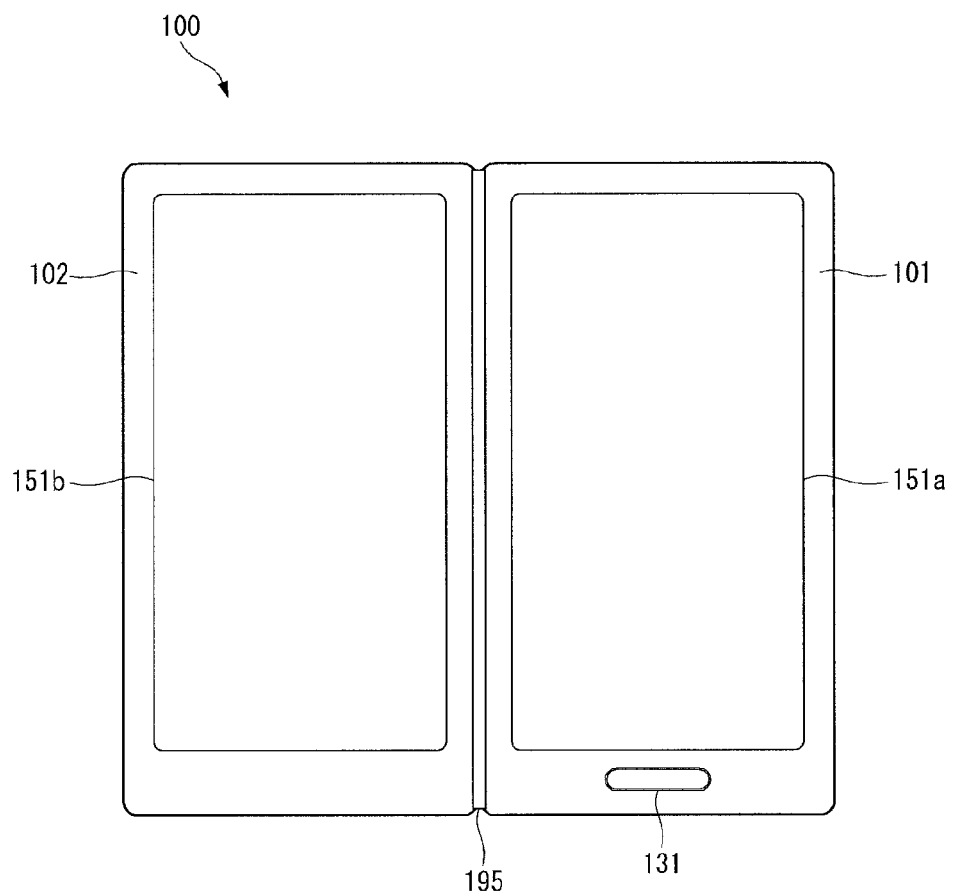
Figure 4B:
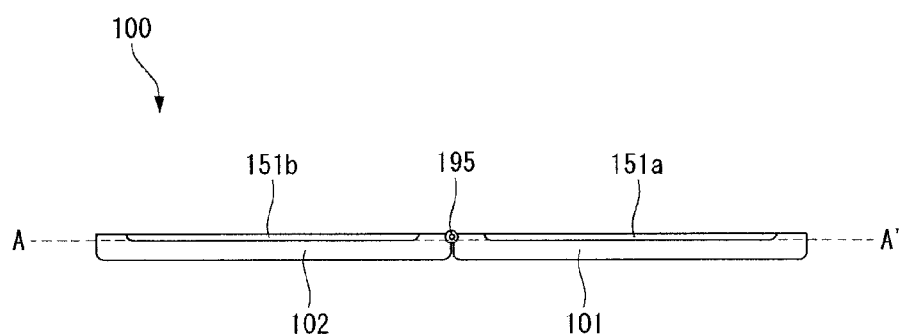

FIG. 2 is a perspective view showing the first body 101 and the second body 102 in a closed status. FIG. 3 is a perspective view showing the first body 101 and the second body 102 in a half open status. FIGS. 4A and 4B are a front view and a side view showing the first body 101 and the second body 102 in a fully open status. The user may open and close the first body 101 and the second body 101, as shown in FIGS. 2, 3, 4A and 4B.

The first body 101 may include a first touch screen 151a and the second body 102 may include a second touch screen 151b. The first and second touch screens 151a and 151b may perform both an information inputting function and an information displaying function. The information inputting function can be implemented in a touching manner.

One side of the first body 101 to which the first touch screen 151a is attached and one side of the second body 102 to which the second touch screen 151b is attached may not come into contact with each other when the first and second bodies 101 and 102 are in the closed status. As shown in FIG. 2, the first and second touch screens 151a and 151b may not come into contact with each other when the first and second bodies 101 and 102 are in the closed status.

One side of the first body 101 to which the first touch screen 151a is attached and one side of the second body 102 to which the second touch screen 151b is attached may be located in a substantially same plane when the first and second bodies 101 and 102 are in the fully open status. As shown in FIG. 4B, the first and second touch screens 151a and 151b may be arranged in a substantially same plane when the first and second bodies 101 and 102 are in the fully open status.

The folding of the mobile terminal 100 into the first body 101 and the second body 102 is not limited to the example shown in FIGS. 4A and 4B. For example, an angle α between the first and second bodies 101 and 102 may be in a range of 0 to 180°, as shown in FIGS. 2, 3, 4A and 4B. The first and second bodies 101 and 102 may be combined by the combining part 195 such that the angle α between the first and second bodies 101 and 102 becomes greater than 180°.

The controller 180 may sense the open/closed status of the first and second bodies 101 and 102 and the angle α between the first and second bodies 101 and 102 by using the sensing unit 140. The controller 180 may sense a direction of the first touch screen 151a and/or the second touch screen 151b using the sensing unit 140. As shown in FIG. 4A, the mobile terminal 100 may be provided on a desk such that the first touch screen 151a and the second touch screen 151b face the ground or opposite directions when the angle α between the first body 101 and the second body 102 is 180°. The controller 180 may sense a position or direction of the mobile terminal 100.

The sensing unit 140 may include at least one of a hall sensor, a 3-axis or 6-axis motion sensor, a terrestrial magnetic sensor and an acceleration sensor in order to sense the position or direction of the mobile terminal 100.

The mobile terminal 100 may include at least one of a first operating part 131 and a second operating part 132, as shown in FIGS. 2, 3, 4A and 4B. The first and second operating parts 131 and 132 are operating units included in the user input unit 130 and correspond to the key pad.

The mobile terminal 100 may receive a command for controlling the operation of the mobile terminal 100 through at least one of the first operating part 131 and the second operating part 132. Commands input through the first operating part 131 and the second operating part 132 can be set in various manners. For example, commands such as start, finish and scroll may be input through the first operating part 131 and a command for adjusting a volume of sound output from the audio output unit 152 and a command for converting the display 151 into the touch recognition mode may be input through the second operating part 132.

Figure 5:
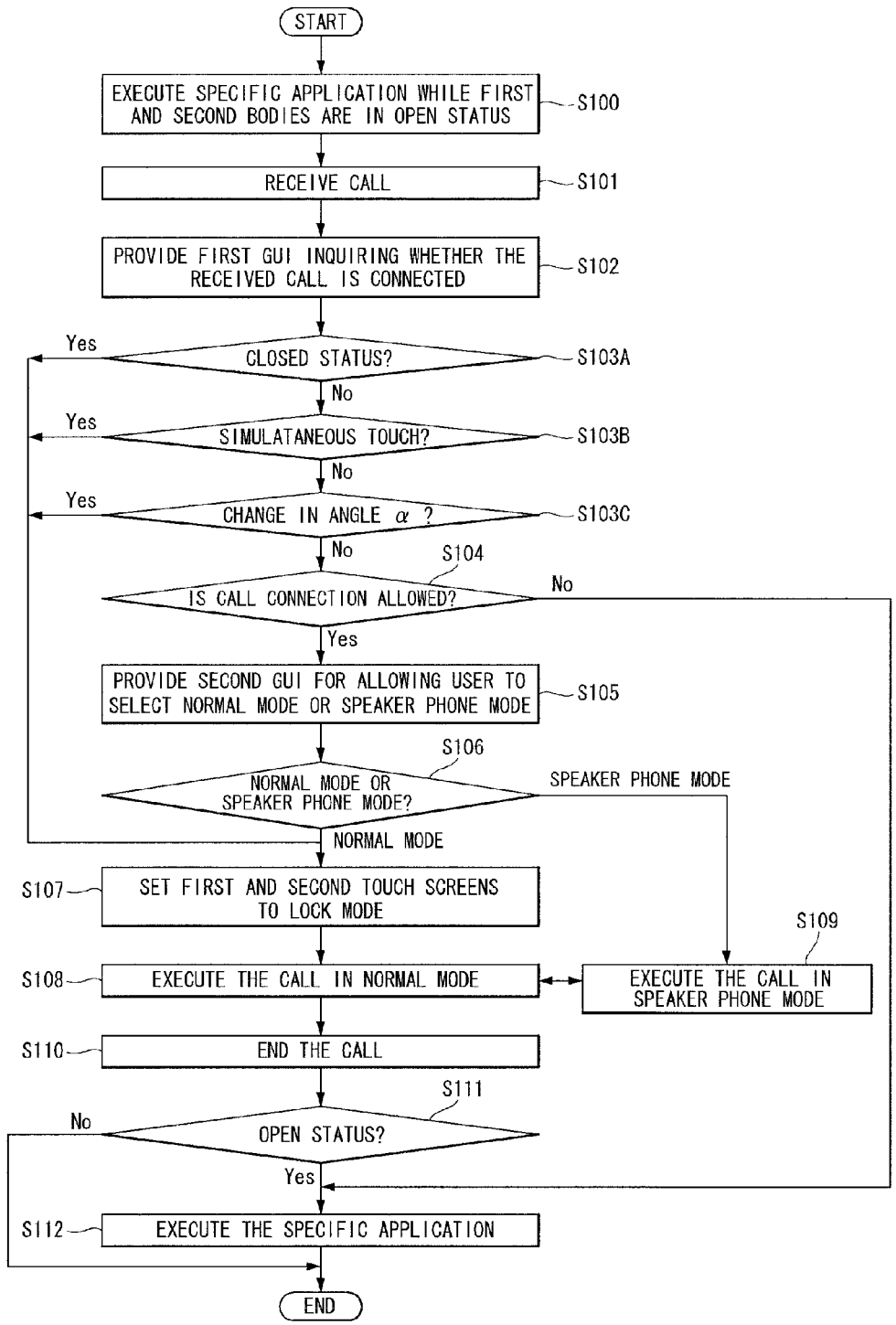
FIG. 5 is a flowchart of a method of executing a call function of a mobile terminal according to a first example embodiment of the present disclosure.

FIG. 5 is a flowchart of a method of executing a call function of a mobile terminal according to a first embodiment of the present disclosure. Other embodiments, operations and orders of operations are also within the scope of the present disclosure.

The controller 180 may execute a specific application when the first body 101 and the second body 102 are in an open status in operation S100.

FIGS. 6(a) and 6(b) illustrate exemplary images displayed on the mobile terminal 100 when operation S100 is performed. For example, FIGS. 6(a) and 6(b) show a broadcasting application that reproduces a broadcasting signal received through the broadcasting receiving module 111.

As shown in FIG. 6(a), the controller 180 may provide the broadcasting application through the first touch screen 151a. The controller 180 may provide the broadcasting application through the second touch screen 151b. In such instances, a user may place the mobile terminal on a surface when a is approximately 45° to 135°, e.g., a hands free display mode (see, e.g., FIG. 3(b)). Such a mode provides convenience to the user since the mobile terminal may be placed on, e.g., a table, and the user can watch a broadcast without holding the mobile terminal. As shown in FIG. 6(b), the controller 180 may provide the broadcasting application by using the first and second touch screens 151a and 151b as a single screen.

The controller 180 receives a call in operation S101 while carrying out the operation S100 and provide a first graphic user interface (GUI), which inquires whether the received call is connected, to the first touch screen 151a and/or the second touch screen 151b in operation S102.

Figure 7A:
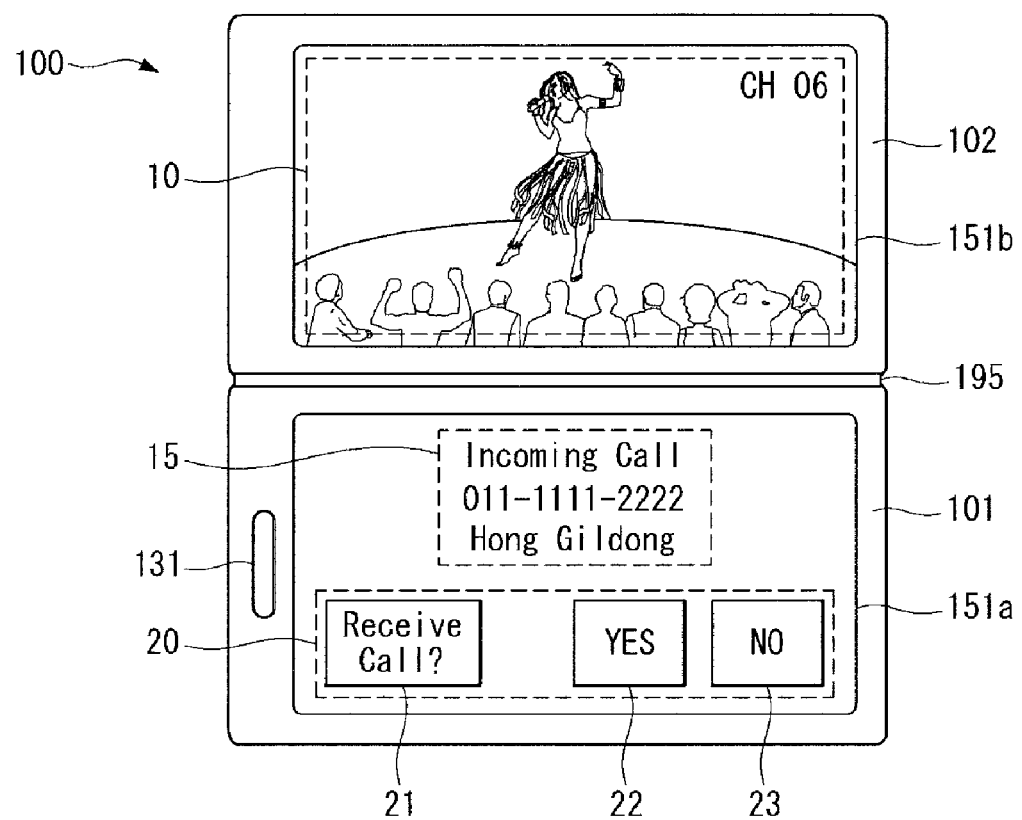
FIG. 7A illustrates exemplary images displayed on the mobile terminal when operations S101 and S102 (in FIG. 5) are performed.
Figure 7C:
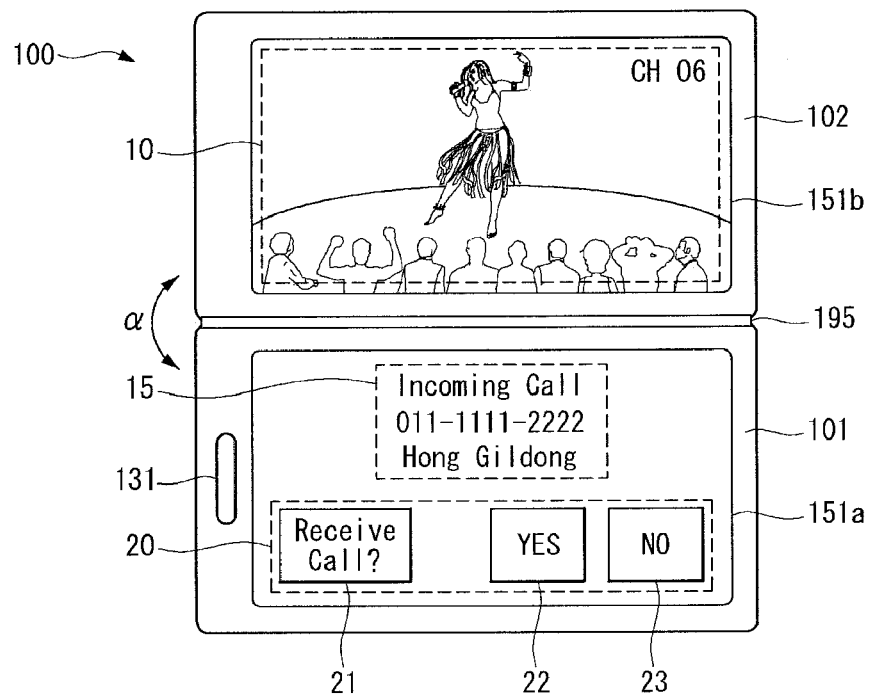
FIG. 7C illustrates an example of step S103C (in FIG. 5)

FIG. 7A illustrates exemplary images displayed on the mobile terminal 100 when operations S101 and S102 are performed. As shown in FIG. 7A, when the controller 180 receives the call, the controller 180 may display information 15 for informing a user of the received call and the first GUI 20 inquires whether the received call is connected on the first touch screen 151a.

The first GUI 20 may display a message 21 for allowing the user to select whether the received call is connected, an interface 22 for allowing the received call to be connected and an interface 23 for rejecting a connection of the received call.

The controller 180 may confirm whether the first and second bodies 101 and 102 are in the closed status in operation S103. As described above, the first and second bodies 101 and 102 are in the closed status when the mobile terminal 100 corresponds to the state shown in FIGS. 2(a) and 2(b).

When the first and second bodies 101 and 102 are in the closed status, the controller 180 may set the first and second touch screens 151a and 151b to a lock mode and connect the call in a normal mode in operation S108. In the normal mode, a voice signal received from a person who makes the call is output through a receiver. In a speaker phone mode (explained below), the voice signal received from the person who makes the call is output through a speaker. The normal mode and the speaker phone mode are terminologies used in the field of mobile terminals providing the call function.

When the first and second touch screens 151a and 151b are set to the lock mode, the first and second touch screens 151a and 151b are inactivated. The controller 180 may not receive touch signals through the first and second touch screens 151a and 151b when the first and second touch screens 151a and 151b are in the lock mode.

Figure 8:
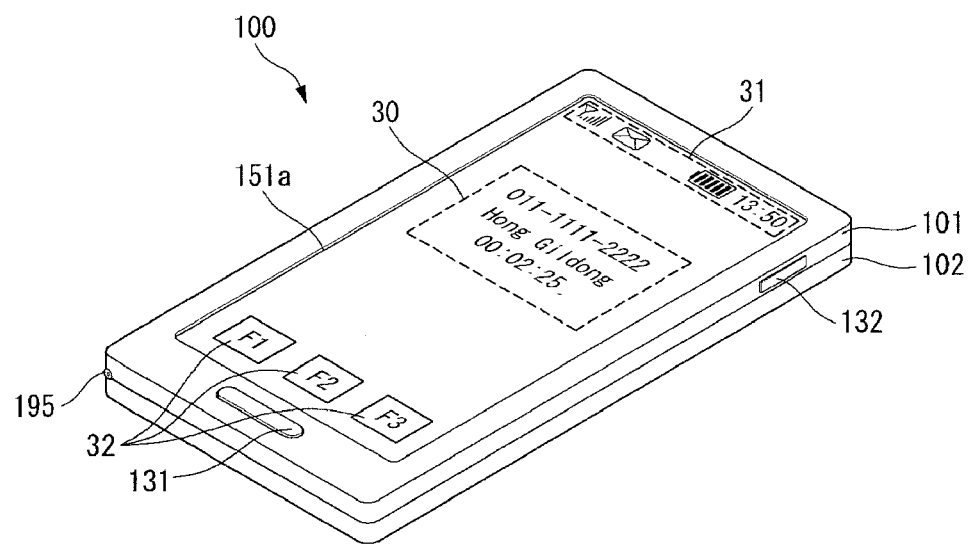
FIG. 8 illustrates an exemplary image displayed on the mobile terminal when operation S108 (in FIG. 5) is performed.

FIG. 8 illustrates an exemplary image displayed on the mobile terminal 100 when the operation S108 is performed. If the user receives the call while watching a broadcasting program when the first and second bodies 101 and 102 are in the open status, the user may connect the received call by operating the mobile terminal 100 such that the first and second bodies 101 and 102 become the closed status. When the first and second bodies 101 and 102 become the closed status while the first GUI 20 is provided, the controller 180 may recognize the closed status as a command that the received call should be connected and connect the received call.

As shown in FIG. 8, the controller 180 may display information 30 of the call on the first touch screen 151a and/or the second touch screen 151b when the received call is connected. The information 30 on the connected call may include information on the person who makes the call and/or a call execution time.

The controller 180 may execute the connected call in the speaker phone mode when the first and second bodies 101 and 102 are changed from the closed status to the open status while the connected call is executed in the normal mode.

When the received call is connected, the controller 180 may display icons 32 corresponding to functions with respect to the connected call on the first touch screen 151a and/or the second touch screen 151b. For example, functions corresponding to the icons 32 may include a function of switching the normal mode and the speaker phone mode to each other, a recording function, a call ending function, a function of displaying/searching menus, etc. Such functions may be selected by first unlocking the touch screen 151a.

If the mobile terminal is not in a closed status in step S103A, and in an open status of FIG. 7A, a determination is made by, e.g., microcontroller, detection of simultaneous touch of first and second touch screens 151a and 151b, as shown in FIG. 7B. A substantially simultaneous touch would indicate that the user is initiating a process to close the mobile terminal to a closed state, and intends to accept the call. If simultaneous touch is detected, then the first and second touch screen screens are set to the lock mode of step S107.

If simultaneous touch is not detected, then a determination is made by, e.g., microcontroller for change in the angle α between the first body 101 and the second body 102. An initial change in the angle α would indicate that the user is initiating a process to close the mobile terminal to a closed state, and intends to accept the call. A substantially simultaneous touch may not have been detected in step S103B because one or both hands may be touching, e.g., the bevel or body 101 and/or 102, rather than the touch screens 151a and 151b.

The controller 180 may determine whether a call connection acknowledgement signal is received when the first and second bodies 101 and 102 are in the open status in operation S104. For example, when the controller 180 receives a touch signal applied to the interface 22 included in the first GUI 20, the controller 180 may recognize the received touch signal as the call connection acknowledgement signal.

When the call connection acknowledgement signal is received in operation S104, the controller 180 may provide a second GUI for allowing the user to select one of the normal mode and the speaker phone mode to the first touch screen 151a and/or the second touch screen 151b in operation S105.

Figure 9:
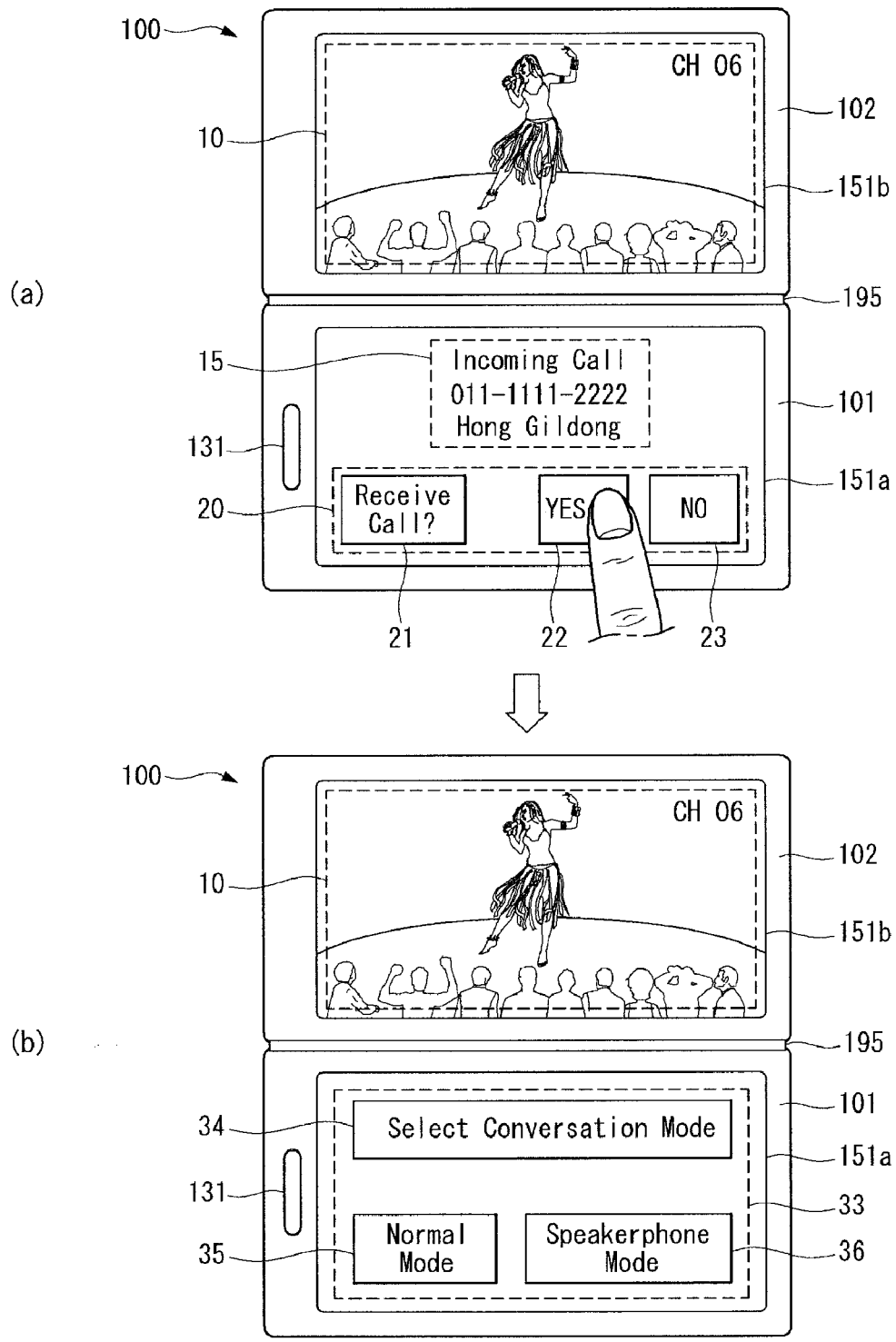
FIG. 9 illustrates exemplary images displayed on the mobile terminal when operations S104 and S105 (in FIG. 5) are performed.

FIG. 9 illustrates exemplary images displayed on the mobile terminal 100 when the operations S104 and S105 are performed. As shown in FIG. 9(a), the controller 180 may receive the call connection acknowledgement signal through the first GUI 20. Further, the controller 180 may display the second GUI 33 on the first touch screen 151a, as shown in FIG. 9(b).

As shown in FIG. 9(b), the second GUI 33 may display a message 34 for allowing the user to select a conversation mode for the received call, an interface 35 for selecting the normal mode as the conversation mode and an interface 36 for selecting the speaker phone mode as the conversation mode.

The controller 180 may receive a signal through the second GUI 33 and determine whether the signal received through the second GUI 33 designates the normal mode or the speaker phone mode in operation S106.

Figure 10:
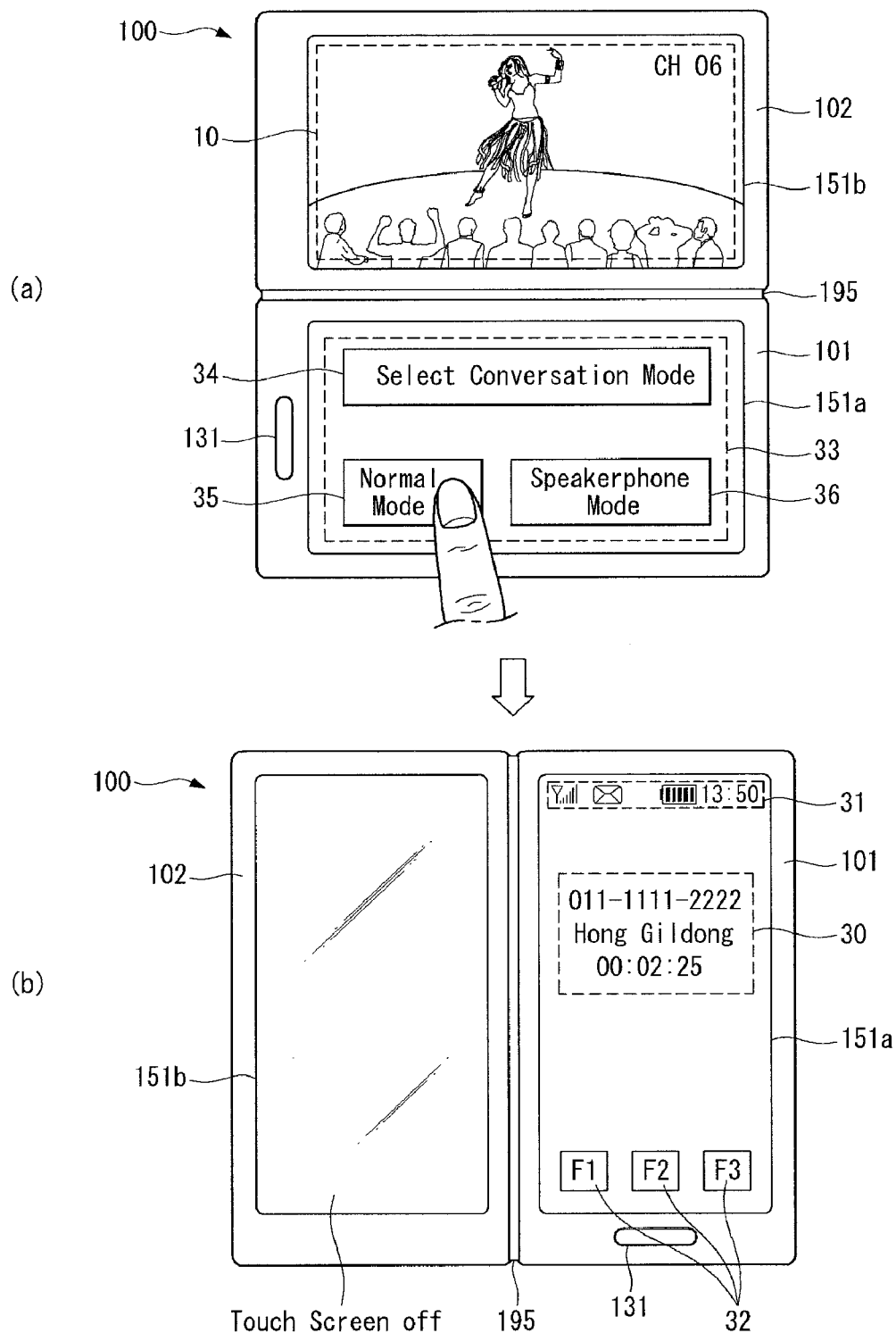
FIG. 10 illustrates exemplary images displayed on the mobile terminal when operation S108 (in FIG. 5) is performed.

When it is determined that the signal received through the second GUI 33 designates the normal mode in operation S106, the controller 180 may connect the received call and execute the call in the normal mode in operation S108. The controller 180 may set the first and second touch screens 151a and 151b to the lock mode before executing the call in the normal mode in operation S107. FIG. 10 illustrates exemplary images displayed on the mobile terminal 100 when the operation S108 is performed.

When it is determined that the signal received through the second GUI 33 designates the speaker phone mode in operation S106, the controller 180 may connect the received call and execute the call in the speaker phone mode in operation S109.

Figure 11:
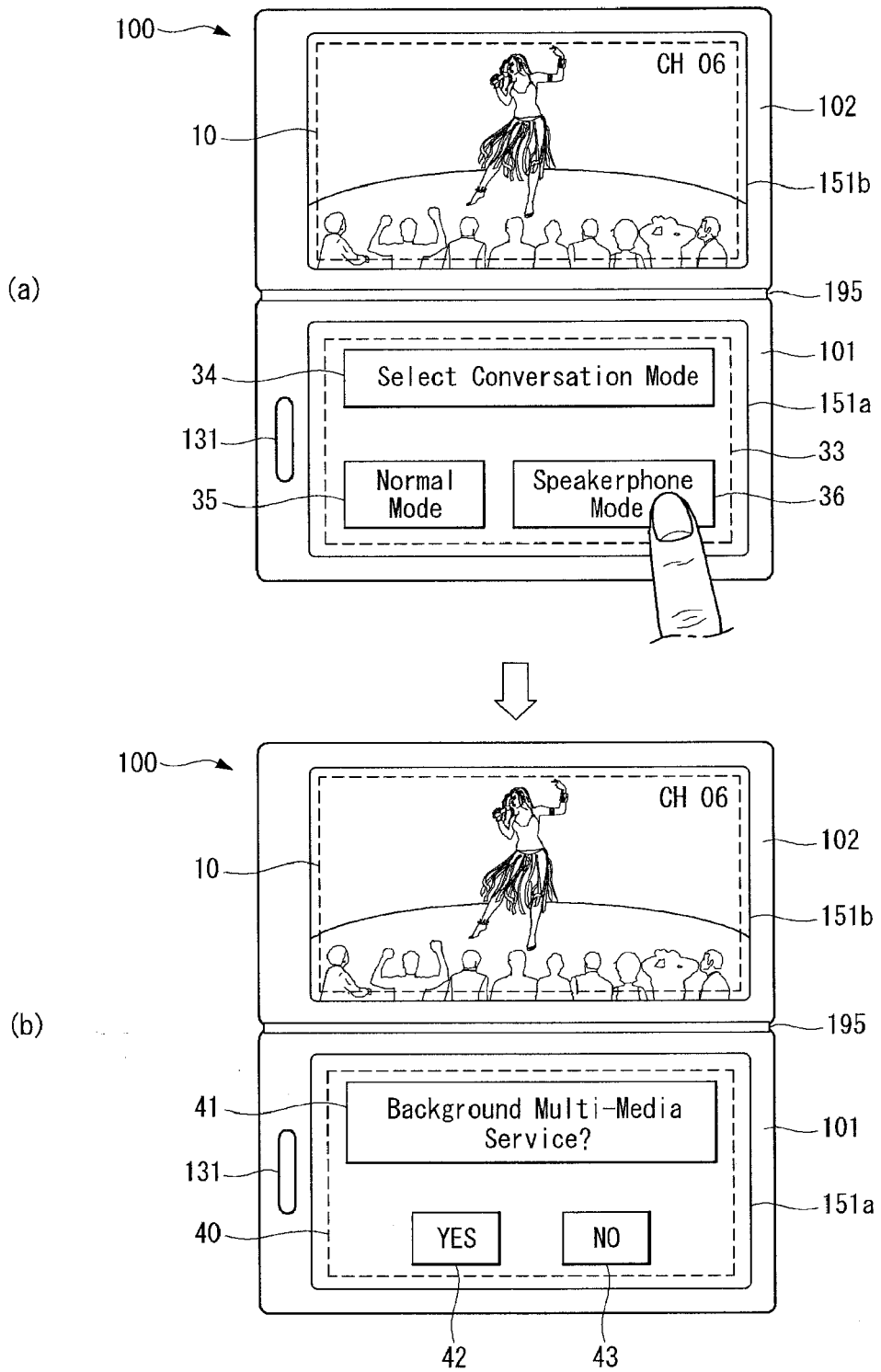
FIGS. 11, 12 and 13 illustrate exemplary images displayed on the mobile terminal when operation S109 (in FIG. 5) is performed.
Figure 12:
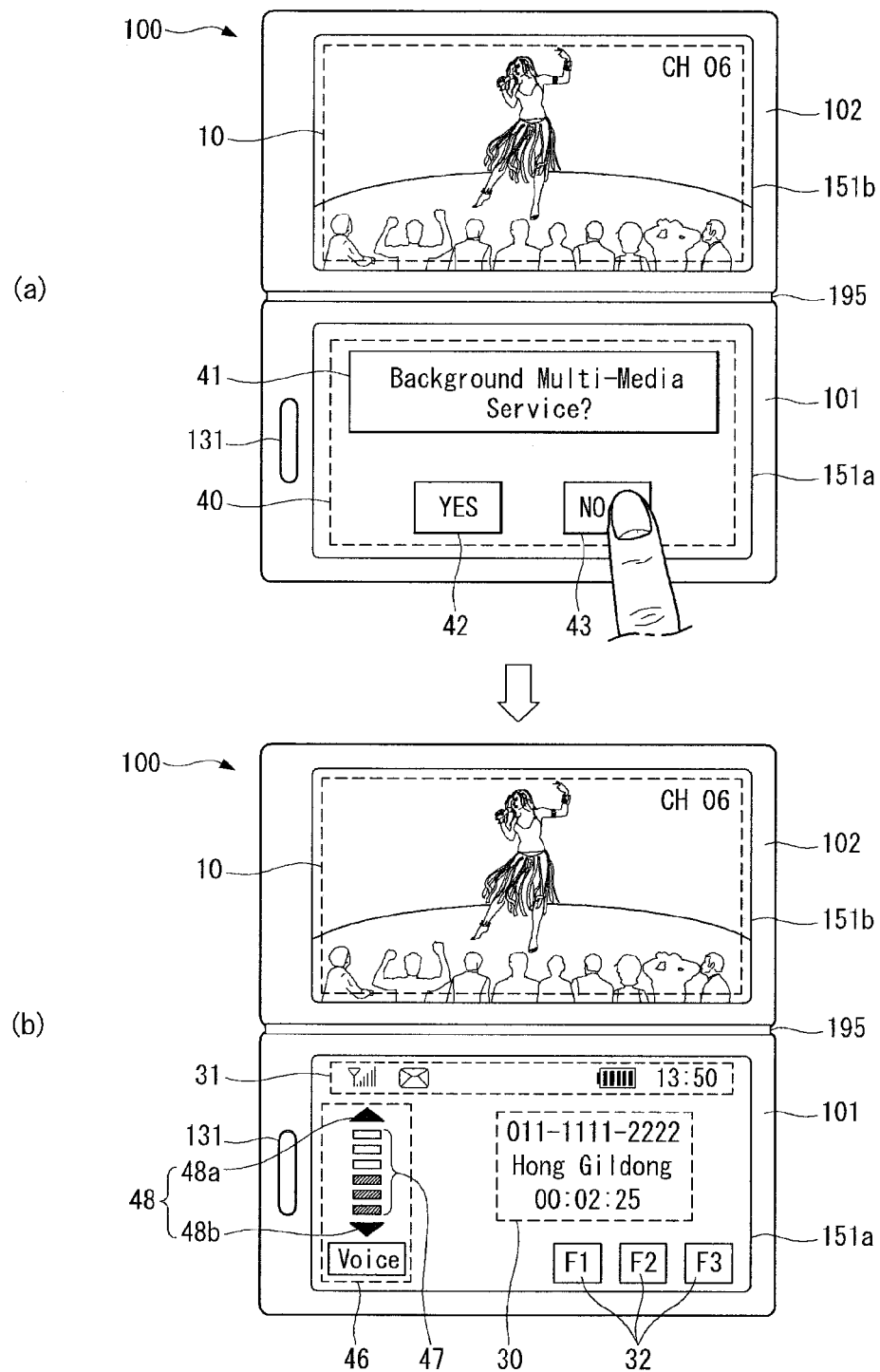
Figure 13:
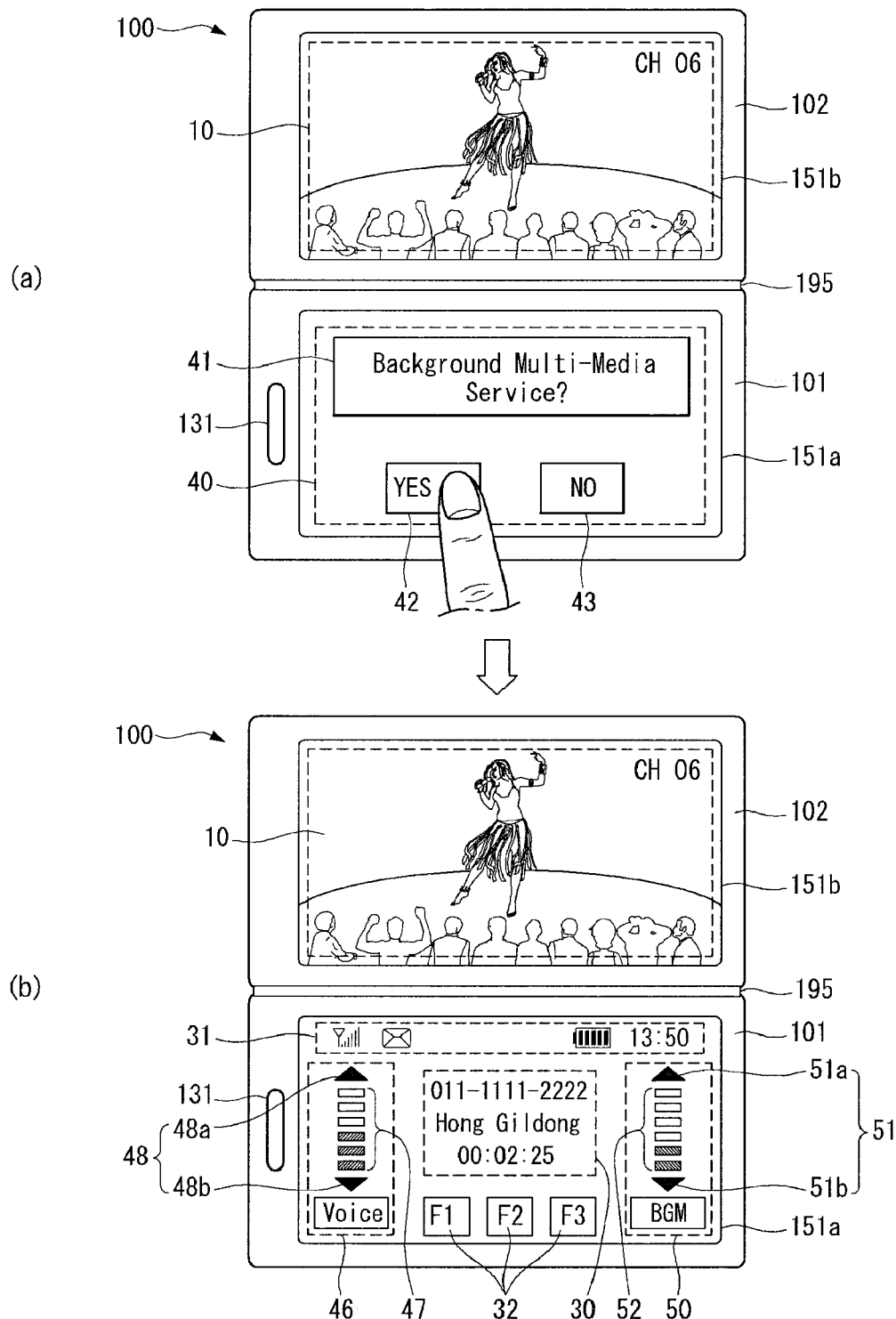

FIGS. 11, 12 and 13 illustrate exemplary images displayed on the mobile terminal 100 when the operation S109 is performed.

When the controller 180 executes the call in the speaker phone mode, the controller 180 may display a third GUI 40 that inquires whether the specific application executed before the call is received is continuously performed or inquires whether restrictive execution of the specific application is performed based on a type of the specific application.

As shown in FIG. 11, when the user selects the speaker phone mode, the controller 180 may provide the third GUI 40 that inquires whether an audio signal output before the call is received is continuously output.

As shown in FIG. 11(b), the third GUI 40 may display a message 41 for allowing the user to select whether the audio signal is continuously output, an interface 42 for selecting continuous output of the audio signal and an interface 43 for selecting interruption of output of the audio signal.

FIG. 12 shows images displayed on the mobile terminal 100 when the user selects interruption of output of the audio signal. FIG. 13 shows images displayed on the mobile terminal 100 when the user selects continuous output of the audio signal.

As shown in FIG. 12(b), the controller 180 may stop output of the audio signal and provide an interface 46 for controlling a volume of the voice of the call output in the speaker phone mode.

The interface 46 for controlling the volume of the call voice may include an interface 47 for indicating an overall range of the volume of the call voice and a current volume of the call voice in the overall range and an interface 48 for varying the current volume of the call voice. The controller 180 may increase the volume of the call voice when an interface 48a is touched and decrease the volume of the call voice when an interface 48b is touched.

As shown in FIG. 13(b), the controller 180 may provide the interface 46 for controlling the volume of the call voice output in the speaker phone mode and an interface 50 for controlling a level of the audio signal when the user selects continuous output of the audio signal.

The interface 50 for controlling the level of the audio signal may include an interface 52 for indicating an overall range of the level of the audio signal and a current volume of the audio signal in the overall range and an interface 51 for varying the current level of the audio signal. The controller 180 may increase the level of the audio signal when an interface 51a is touched and decrease the level of the audio signal when an interface 51b is touched.

The normal mode and the speaker phone mode may be switched between each other while the call is executed in various manners.

For example, switching between the normal mode and the speaker phone mode may be performed by operating a specific key button included in the user input unit 130 shown in FIG. 1 or by changing an angle between the first and second bodies 101 and 102. For example, the controller 180 may execute the connected call in the normal mode when the first and second bodies 101 and 102 are in the closed status and perform the connected call in the speaker phone mode when the first and second bodies 101 and 102 are in the open status, as described above.

Switching between the normal mode and the speaker phone mode may be performed by touching a function icon displayed on the first touch screen 151 or the second touch screen 151b. When the first touch screen 151a or the second touch screen 151b, on which the function icon is displayed, is set to the lock mode, the function icon may be touched after the lock mode is cancelled.

The controller 180 may end the call executed in the normal mode or the speaker phone mode according to a user's command or the person who makes the call in operation S110.

The controller 180 may determine whether the first and second bodies 101 and 102 are in the open status after the call is ended in operation S111. The controller 180 may re-execute the specific application performed before the call is received in operation S101 when the first and second bodies 101 and 102 are in the open status in operation S112.

For example, the controller 180 may execute the specific application if the call is ended while the first and second bodies 101 and 102 are in the open status or if the first and second bodies 101 and 102 become the open status after the call is ended.

When carrying out the operation S112, the controller 180 may return to the state before the call is received or execute the specific application in the default state set when the specific application is initially executed.

After the call is ended, the controller 180 may display a fourth GUI that inquires whether the specific application executed before the call is received is continuously carried out irrespective of the status of the first and second bodies 101 and 102.

Figure 14:
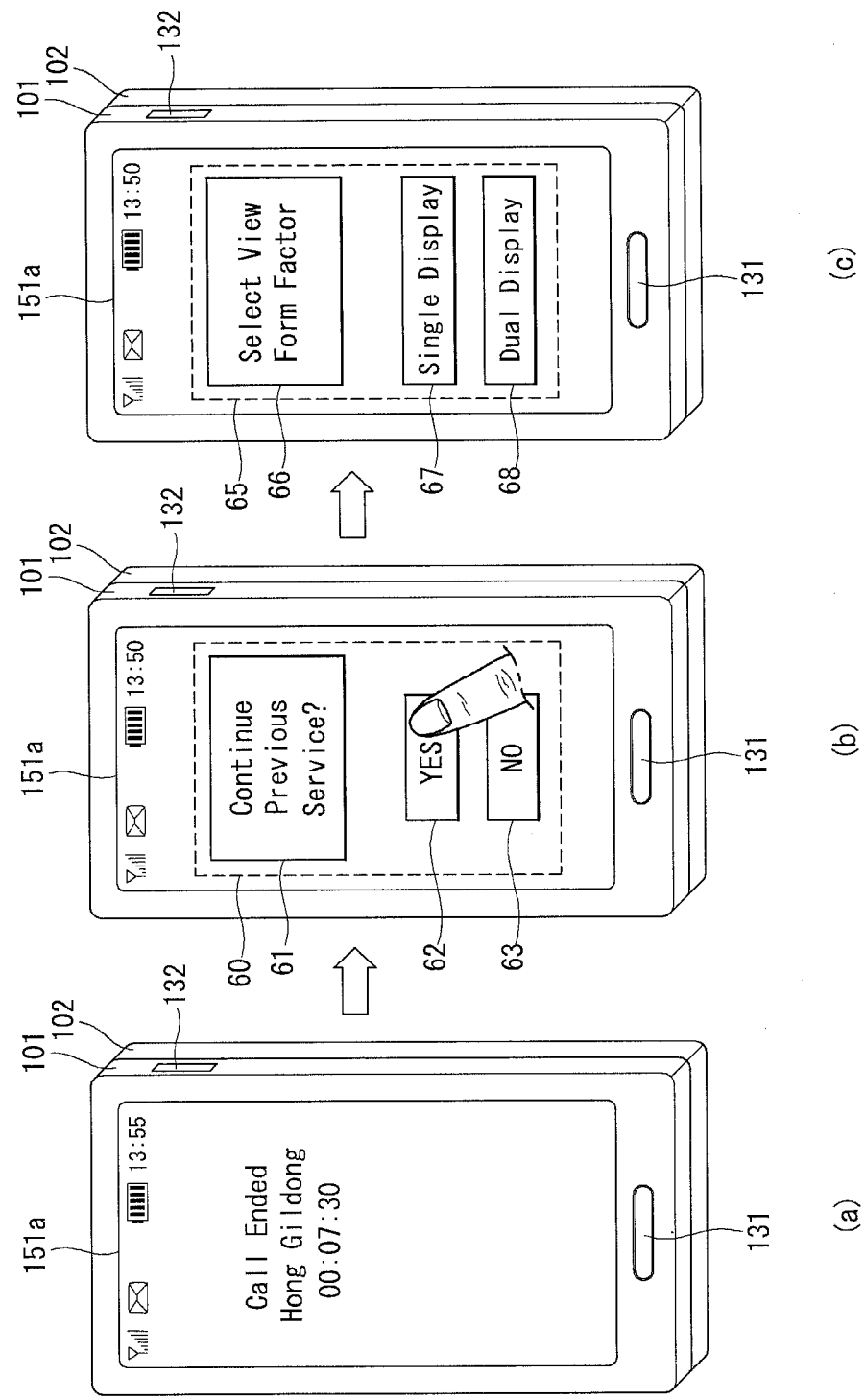
FIG. 14 illustrates an operation of providing a fourth graphic user interface when a call is ended.

FIG. 14 illustrates an operation of providing the fourth GUI when the call is ended. FIG. 14(a) shows an image displayed right after the call is ended, which provides information on the ended call.

As shown in FIG. 14(b), the controller 180 may provide the fourth GUI 60 that inquires whether the specific application is continuously executed after providing the information on the ended call.

The fourth GUI 60 may display a message 61 for allowing the user to determine whether the specific application is continuously executed and include an interface 62 for acknowledging continuous execution of the specific application and an interface 63 for rejecting the continuous execution of the specific application, as shown in FIG. 14(b).

As shown in FIGS. 14(b) and 14(c), when the controller 180 receives a signal that acknowledges the continuous execution of the specific application through the fourth GUI 60, the controller 180 may provide a fifth GUI 65 that inquires whether only one of the first and second touch screens 151a and 151b is used or both of them are used to output video information when it is required to output the video information according to the specific application.

As shown in FIG. 14(c), the fifth GUI 65 may display a message 66 for allowing the user to select a view form factor and include an interface 67 for selecting dual display as the view form factor and an interface 68 for selecting a single display as the view form factor.

For example, when the user touches the interface 67 for selecting the dual display, the controller 180 may re-execute the specific application as shown in FIG. 6(a). When the user touches the interface 68 for selecting the single display, the controller 180 may re-execute the specific application as shown in FIG. 6(a).

Figure 15:
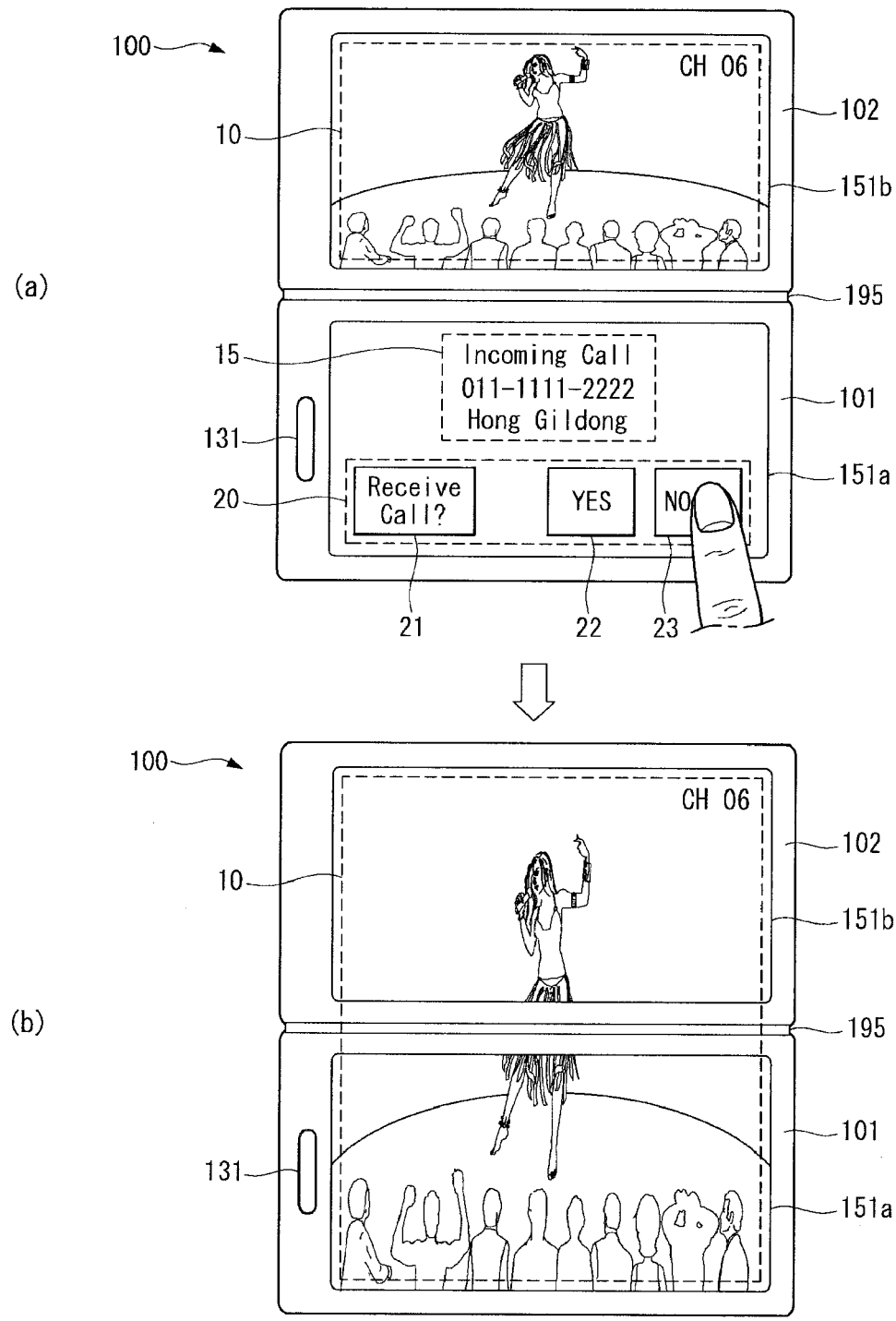
FIG. 15 illustrates exemplary images displayed on the mobile terminal according to operation S112 (in FIG. 5) when a user rejects connection of a received call.

Furthermore, when the controller 180 receives a signal that rejects connection of the call in operation S104, the controller 180 may eliminate the information 15 that informs the user that the call is received and the first GUI 20 that inquires whether the received call is connected and re-executes the specific application performed before the call is received in operation S112. FIG. 15 illustrates exemplary images displayed on the mobile terminal 100 according to the operation S112 when the user rejects connection of the received call.

Embodiments of the present disclosure may provide a method of executing a call function that provides various graphic user interfaces with respect to the call function when a mobile terminal having a plurality of touch screens executes the call function.

Embodiments of the present disclosure may provide a mobile terminal having a first body including a first touch screen, a second body having a second touch screen, a combining part that combines the first body and the second body with each other, a wireless communication unit, and a controller to connect a call that is received through the wireless communication unit when the first and second bodies are in an open status, when the first and second bodies become a closed status. The wireless communication unit and the controller may be included in one of the first and second bodies.

A method may be provided for executing a call function of a mobile terminal including first and second bodies respectively having first and second touch screens and providing the call function. The method may include receiving a call while the first and second bodies are in an open status, connecting the received call when the first and second bodies become a closed status, and inactivating the first and second touch screens when the received call is connected.

When the mobile terminal executes the call function, various graphic user interfaces with respect to the call function are provided to a user such that the user can conveniently use the mobile terminal.

The above-described method of executing a call function of a mobile terminal may be written as computer programs and can be implemented in digital computers that execute the programs using a computer readable recording medium. The method of executing a call function of a mobile terminal may be executed through software. The software may include code segments that perform required tasks. Programs or code segments can also be stored in a processor readable medium or transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium can also be distributed over network coupled computer systems so that the computer readable code is stored and executed in a distribution fashion.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of operating a mobile terminal having a first touch panel and a second touch panel, the first and second touch panels being movable relative to each other, the method comprising:
displaying content on at least one of the first touch panel and the second touch panel in an open status of the first and second touch panels;
receiving a call when the content is displayed on at least one of the first touch panel and the second touch panel in the open status of the first and second touch panels;
connecting the received call when the first and second touch panels change from the open status to a closed status while the mobile terminal is receiving the call;
locking the first and second touch panels when the call is connected.

2. A method of operating a mobile terminal having a first touch panel and a second touch panel, the first and second touch panels being movable relative to each other, the method comprising:
providing content on at least one of the first touch panel and the second touch panel in an open state, wherein in the open state, a prescribed first angle exist between the first touch panel and the second touch panel such that the first touch panel and the second touch panel face substantially in a same direction;
receiving a call when the content is displayed on at least one of the first touch panel and the second touch panel;
connecting the received call when the prescribed first angle between the first and second touch panels changes to beyond a prescribed second angle while the mobile terminal is receiving the call, wherein the prescribed first angle and the prescribed second angle are different from each other; and
locking the first and second touch panels when the call is connected.

3. The method of claim 1, wherein the first and second touch panels are connected to each other by at least one hinge such that the first and second touch panels are foldable relative to each other.

4. The method of claim 1, wherein the call is provided in a speaker phone mode when the status of the first and second touch panels changes back to the open status while the call is connected, and wherein in the speaker phone mode, the voice signal received by performing the connected call is output through a speaker.

5. The method of claim 4, wherein the first and second touch panels are arranged in a substantially same plane in a fully open status.

6. The method of claim 4, wherein the speaker phone mode is cancelled when the status of the first and second touch panels changes to the closed status while the call is connected in the speaker phone mode.

7. The method of claim 1, wherein the display of content is halted when the call is received or the received call is connected.

8. The method of claim 7, wherein the display of the content continues when the connected call ends.

9. The method of claim 7, wherein the display of the content continues when the status of the first and second touch panels changes to the open status while the call is connected.

10. The method of claim 1, wherein the first touch panel and the second touch panel are coupled by a hinge such that the mobile terminal can be folded, a side of the mobile terminal to which the first touch panel is attached and a side of the mobile terminal to which the second touch panel is attached do not come into contact with each other in the closed status, and the first touch panel and the second touch panel are arranged in a substantially same plane in a fully open status.

11. The method of claim 2, wherein a substantially simultaneous input to the first touch panel and the second touch panel is provided by touching the first touch panel with one hand and touching the second touch panel by the other hand.

12. A display device comprising:
a first touch panel;
a second touch panel, the first and second touch panels being movable relative to each other; and
a controller configured to control the first and second touch panels, the controller to provide content on at least one of the first touch panel and the second touch panel in an open status of the first and second touch panels, the controller to receive a call when the content is provided on at least one of the first and second touch panels in the open status of the first and second touch panels, the controller to connect the received call when the first and second touch panels change from the open status to a closed status while the display device receives the call, and the controller to lock the first and second touch panels when the call is connected.

13. A display device comprising:

a first touch panel;

a second touch panel, the first and second touch panels being movable relative to each other; and a controller to control the first and second touch panels, the controller to provide content on at least one of the first touch panel and the second touch panel in an open state, and in the open state, a prescribed first angle exists between the first touch panel and the second touch panel such that the first touch panel and the second touch panel face substantially in a same direction, the display device to receive a call when the content is provided on at least one of the first and second touch panels in the open state of the first and second touch panels, the display device to connect the received call when the prescribed first angle between the first and second touch panels changes to beyond a prescribed second angle while the display device is receiving the call, and the display device to lock the first and second touch panels when the call is connected, wherein the prescribed first angle and the prescribed second angle are different from each other.

14. The display device of claim 13, wherein the controller is further configured to halt output of the content upon connecting the received call, and to re-provide the content on the at least one of the first and second touch panels when the connected call ends while the first and second touch panels are in the open state or when the first and second touch panels become the open state after the connected call ends.

15. The display device of claim 12, wherein the controller is further configured to halt output of the content upon connecting the received call, and to re-provide the content on the at least one of the first and second touch panels when the connected call ends while the first and second touch panels are in the open status or when the first and second touch panels become the open status after the connected call ends.

16. A display device comprising:

a first body including a first touch panel;

a second body including a second touch panel;

a combining part combining the first body and the second body with each other such that the first and second bodies may move relative to each other; and a controller configured to switch the display device from a normal mode to a speaker phone mode when the first and second touch panels change from a closed status to an open status while performing a connected call, and the controller to switch the display device from the speaker phone mode to the normal mode when the first and second touch panels change from the open status to the closed status while performing a connected call, wherein in the normal mode while in the closed status, a voice signal received from a person performing the connected call is output from the mobile terminal after passing through a receiver, and in the speaker phone mode while in the open status, the voice signal received from the person performing the connected call is output from the mobile terminal after passing through a speaker.

* * * * *